US010425939B2

(12) United States Patent
Nicas et al.

(10) Patent No.: US 10,425,939 B2
(45) Date of Patent: Sep. 24, 2019

(54) METHOD AND APPARATUS FOR AUTOMATED SIGNAL ANALYSIS AND REPORTING AMONG RF RECEIVER DEVICES

(71) Applicant: AT&T Intellectual Property I, L.P., Atlanta, GA (US)

(72) Inventors: Nicholas Nicas, Blue Springs, MO (US); Todd Andrew Fryer, Liberty, MO (US); Douglas Medina, Grain Valley, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2 days.

(21) Appl. No.: 14/953,956

(22) Filed: Nov. 30, 2015

(65) Prior Publication Data
US 2017/0156146 A1 Jun. 1, 2017

(51) Int. Cl.
*H04W 72/04* (2009.01)
*H04B 17/318* (2015.01)

(52) U.S. Cl.
CPC ...... *H04W 72/0453* (2013.01); *H04B 17/318* (2015.01)

(58) Field of Classification Search
CPC .......................................... H04N 21/60–6143
USPC .......... 455/62, 3.02, 134, 135, 179.1, 226.2; 725/64, 87, 110
See application file for complete search history.

(56) References Cited

U.S. PATENT DOCUMENTS 7,460,848 B1 12/2008 Brunn et al.
7,826,837 B1 11/2010 Sylvester

| | | | |
|---|---|---|---|
| 2003/0028891 A1 | 2/2003 | Hardt et al. | |
| 2003/0121047 A1* | 6/2003 | Watson | H04N 7/17318 725/93 |
| 2004/0107436 A1* | 6/2004 | Ishizaki | H04H 20/06 725/36 |

(Continued)

OTHER PUBLICATIONS

Shane B. Eisenman, et al., "E-CSMA: Supporting Enhanced CSMA Performance in Experimental Sensor Networks Using Per-neighbor Transmission Probablitity Thresholds", 26th IEEE International Conference on Computer Communications, 2007, pp. 1-9.

(Continued)

*Primary Examiner* — Edward F Urban
*Assistant Examiner* — Rui M Hu
(74) *Attorney, Agent, or Firm* — Chiesa Shahinian & Giantomasi PC

(57) ABSTRACT

A receiver control is configured to receive signal receive level data from a plurality of signal receivers. The receiver control determines if a signal receive level is lower than expected. In response to determining that the signal receive level is lower than expected, it is determined if an alternate signal is available via an alternate signal path. In response to determining that an alternate signal is available, an instruction is transmitted to one of the plurality of signal receivers with an indication that the alternate signal is to be received via the alternate signal path. The receiver control transmits the alternate signal via the alternate signal path to the one of the plurality of signal receivers experiencing lower than expected signal receive levels in one embodiment. The receiver can resume utilizing an original signal via an original signal path when the signal receive level of the original signal returns to expected levels.

17 Claims, 3 Drawing Sheets

(56) References Cited

U.S. PATENT DOCUMENTS

| | | | |
|---|---|---|---|
| 2008/0163311 A1* | 7/2008 | St John-Larkin | H04N 21/6587 725/68 |
| 2008/0192820 A1* | 8/2008 | Brooks | H04N 7/17318 375/240.02 |
| 2010/0325545 A1* | 12/2010 | Bennett | G06F 3/1415 715/716 |
| 2011/0026902 A1* | 2/2011 | Nguyen | H04N 5/76 386/295 |
| 2011/0126249 A1* | 5/2011 | Makhlouf | H04N 7/17318 725/109 |
| 2011/0145869 A1* | 6/2011 | Rahman | H04N 21/4383 725/87 |
| 2011/0159804 A1* | 6/2011 | Petruzzelli | H04B 17/318 455/9 |
| 2013/0042280 A1* | 2/2013 | Chen | H04N 21/44209 725/68 |
| 2013/0044842 A1 | 2/2013 | Wang et al. | |
| 2013/0201915 A1 | 8/2013 | Wang | |
| 2014/0057549 A1* | 2/2014 | Ling | H04H 20/74 455/3.02 |
| 2014/0098899 A1* | 4/2014 | Mohandas | H04N 19/48 375/240.27 |
| 2014/0195651 A1* | 7/2014 | Stockhammer | H04N 21/23439 709/219 |
| 2015/0179221 A1* | 6/2015 | McCarthy, III | G11B 27/034 386/248 |
| 2015/0189346 A1* | 7/2015 | Naik Raikar | H04N 21/44209 725/64 |
| 2016/0021424 A1* | 1/2016 | Andersson | H04N 21/4383 725/110 |
| 2016/0043747 A1* | 2/2016 | Littlejohn | H04N 21/44209 455/456.1 |
| 2016/0191913 A1* | 6/2016 | Martch | H04N 17/004 348/189 |

OTHER PUBLICATIONS

Arunchandar Vasan, et al., "ECHOS-enhanced Capacity 802.11 Hotspots", 24th Annual Joint Conference of the IEEE Computer and Communication Societies, Proceedings IEEE vol. 3, 2005, pp. 1-11.

Sourav Kumar Dandapat, et al., "Smart Association Control in Wireless Mobile Environment Using Max-flow", Network and Service Management, IEEE Transactions on 9.1, 2012, pp. 1-14.

* cited by examiner

METHOD AND APPARATUS FOR AUTOMATED SIGNAL ANALYSIS AND REPORTING AMONG RF RECEIVER DEVICES

BACKGROUND

The present disclosure relates generally to satellite broadcast receivers, and more particularly to automated signal analysis and reporting among radio frequency (RF) receiver devices.

Consumers can receive broadcasts via satellite using direct broadcast satellite (DBS) radio frequency (RF) receivers. These consumers have a satellite dish installed at their residence for receiving signals from a satellite. The satellite dish transmits broadcast signals to a signal receiver. The signal receiver converts the broadcast signal into a display signal which is output to a consumer's display, such as a television.

Broadcast signals from the satellite can be disrupted by a variety of obstructions such as aircraft and atmospheric events. Those signal disruptions can affect the quality of content viewed by a user. For example, signal disruption can cause pixilation of a displayed video. Signal disruptions often require troubleshooting. In addition, the restoration process to reestablish a disrupted or lost signal can be long and cumbersome. As a result, consumers can become frustrated with signal disruptions.

SUMMARY

In one embodiment, a method for operating a receiver server includes receiving signal receive level data from a plurality of signal receivers for an original signal via an original signal path. In one embodiment, the original signal is a radio frequency signal from a satellite and the original signal path is from the satellite to a dish associated with the plurality of signal receivers. It is determined if a signal receive level is lower than expected. In response to determining that the signal receive level is lower than expected, it is determined if an alternate signal is available via an alternate signal path. In response to determining that an alternate signal is available, an instruction is transmitted to one of the plurality of signal receivers with an indication that the alternate signal is to be obtained via the alternate signal path. A receiver server transmits the alternate signal via the alternate signal path to the one of the plurality of signal receivers experiencing lower than expected signal receive levels. The alternate signal can be transmitted via the alternate signal path using out-of-band communications. In one embodiment, the instruction also includes a timer value that indicates a period of time that the alternate signal is to be received via the alternate signal path. The timer value, in one embodiment, is based on an amount of time over which a prior signal disruption occurred. In one embodiment, the receiver control receives an indication that the signal receive level is at an expected value. In response, an instruction is transmitted to the one of the plurality of signal receivers that includes an indication that the original signal is to be received via the original signal path.

DETAILED DESCRIPTION

Figure 1:
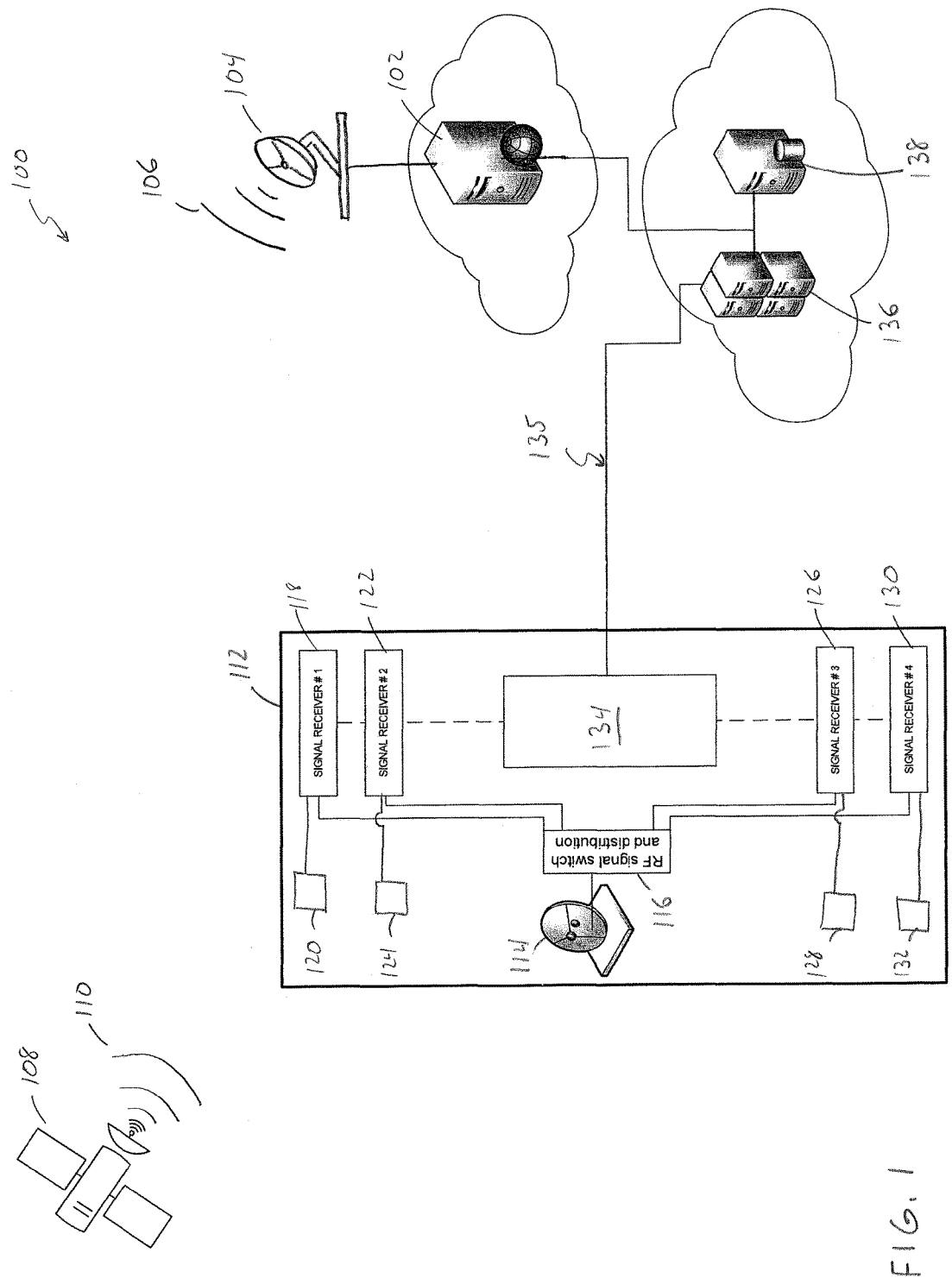
FIG. 1 depicts a direct broadcast satellite system according to an embodiment.

FIG. 1 depicts a direct broadcast satellite (DBS) system 100. Content server 102 stores content for broadcast to consumers. For example, content server 102 can store movies, television shows, commercials, etc. for broadcast to consumers. The content is typically ordered and edited prior to broadcast in accordance with a broadcast schedule. Content server 102 is in communication with transmitter 104. Content server 102 transmits a signal to transmitter 104 comprising content. Transmitter 104 is a device configured to transmit a radio frequency (RF) signal to a satellite. As shown in FIG. 1, transmitter 104 transmits broadcast signal 106 to satellite 108 based on the signal received from content server 102. Satellite 108 is configured to receive broadcast signal 106 and retransmit the signal as broadcast signal 110 to a plurality of receivers located in a large geographic area (e.g. North America, the United States, or a portion of the United States).

Broadcast signal 110 can be received by multiple geographic locations. FIG. 1 depicts residence 112 having dish 114 for receiving broadcast signal 110. Typically, a residence, such as residence 112 will have a single dish, such as dish 114, which is installed and adjusted to receive signals from one or more satellites, such as satellite 108. Dish 114 can be any type of antenna for receiving an RF signal such as broadcast signal 110. Dish 114 transmits broadcast signal 110 to RF signal switch and distribution device 116 (also referred to as RF signal switch 116). RF signal switch 116 is configured to replicate broadcast signal 110 and transmit the signal to one or more signal receivers, such as signal receivers 118, 122, 126, 130. RF signal switch 114 can also be configured to convert broadcast signal 110 into a format compatible with a signal receiver.

Broadcast signal 110 is received by signal receiver 118 and is converted to a display signal for transmission to a display device, such as display device 120. Signal receiver 118, is a device configured to receive broadcast signal 110 and perform one or more operations to provide a display signal to display device 120. For example, signal receiver 118 can be a set top box. Signal receivers 122, 126, and 130 receive broadcast signal 110 and convert the signal to display signals for transmission to respective display devices 124, 128, and 132 in a manner similar to that described above in connection with signal receiver 118 and display 120.

Signal receivers 118, 122, 126, and 130, in one embodiment, are also configured to determine a value for a signal receive level. The signal receive level is the strength of the signal received by a respective signal receiver. Values for signal receive levels can be measured and compared directly with reference values. In one embodiment, actual signal receive level values can be converted to values associated with an arbitrary scale. For example, signal receive level values can be converted to a value on an arbitrary scale of one to five with five being the highest. This conversion can be used to allow comparison of signal receive level values for different receivers having different ranges for actual values. For example, one signal receiver may measure signal receive levels having a range of one to ten volts while another signal receiver can have signal receive levels with a range of one to five volts. Conversion of signal receive values to an arbitrary scale can be used to allow comparison of signal receive levels having different ranges.

Signal receivers 118, 122, 126, 130 are also configured to transmit operation data to a remote location, such as receiver server 136 via data path 135. In one embodiment, data path 135 is a network such as the Internet. Signal receivers, in one embodiment, communicate with receiver server 136 via receiver controller 134 and data path 135.

Receiver controller 134 is configured to compile data received from signal receivers and transmit the compiled data to receiver server 136 via data path 135. In one embodiment, receiver controller 134 is configured to compile and store data from signal receivers 118, 122, 126, and 130 and periodically transmit the compiled data to receiver server 136 via data path 135.

Signal receivers 118, 122, 126, and 130 and receiver controller 134 can transmit and receive various data to and from receiver server 136 via data path 135. Data such as control data, operation data, and signal receive level data transmitted among these components are referred to as in-band communications. Control data comprises data that can be used to affect the operation of signal receivers 118, 122, 126, and 130. Operation data comprises data that indicates use of signal receivers 118, 122, 126, and 130 (e.g., current channel receiver is tuned to, etc.) Signal receive level data pertains to values associated with a strength of a signal received by each of signal receivers 118, 122, 126, and 130.

Receiver server 136 is in communication with receiver database 138 which stores information pertaining to signal receivers, such as signal receivers 118, 122, 126, and 130. In one embodiment, receiver server 136 and receiver database 138 are in communication with content server 102. In such embodiments, receiver server 136 can receive content from content server 102 for transmission to signal receivers 118, 122, 126, and 130 via an alternate signal path (described in further detail below).

In one embodiment, signal disruptions can be compensated for by use of an alternate signal path such as data path 135. Data path 135 is used for in-band communications. Additional data can be transmitted via data path 135. Communication for transmission of data other than control data, operation data, and signal receive level data via data path 135 is referred to as out-of-band communications.

Content can be transmitted to signal receivers 118, 122, 126, and 130 from content server 102 via receiver server 136, data path 135, and receiver controller 134. This alternate signal path can be used when broadcast signals 110 transmitted from satellite 108 are disrupted. Receiver controller 134 is in communication with receivers 118, 122, 126, and 130 and with receiver server 136. In addition, receiver server 136 and receiver database 138 are in communication with content server 102.

Figure 2:
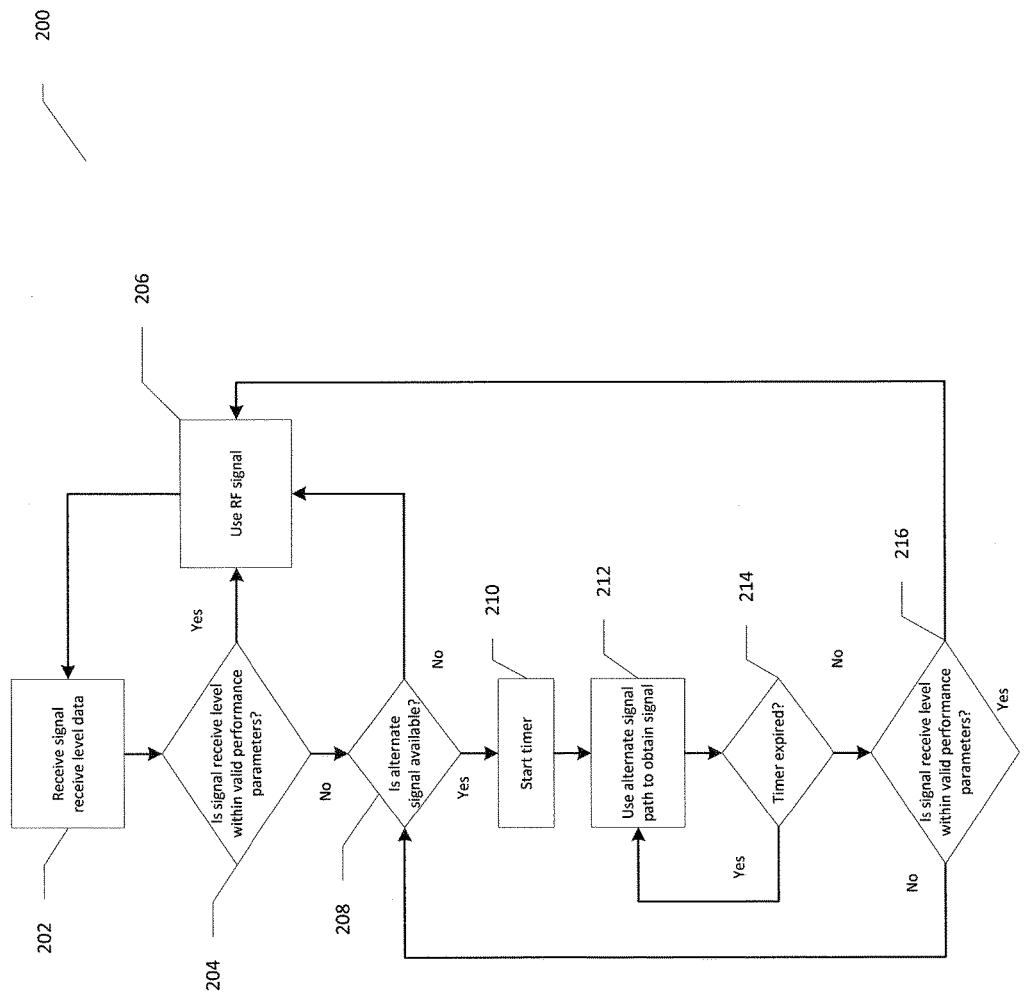
FIG. 2 a flowchart of a method according to an embodiment.

FIG. 2 depicts a flow chart of a method of operating receiver server 136 (shown in FIG. 1), according to one embodiment. At step 202, signal receive level data of a broadcast signal is received by receiver server 136, in one embodiment, from one of signal receivers 118, 122, 126 or 130 via receiver controller 134. As described above, each signal receiver determines a value of a signal receive level of the respective received signal. The method then proceeds to step 204, where it is determined whether a signal receive level within valid performance parameters. In one embodiment, the performance parameters are based on a minimum signal receive level required to be received by a signal receiver in order to display content in an acceptable manner. For example, a minimum signal receive level can be selected so that content generated from received signals has a limited amount of pixilation or other type of video and/or audio distortion. If the signal receive level is within valid performance parameters (i.e., the signal receive level has an expected value) as determined in step 204, the method proceeds to step 206. At step 206, use of the RF signal continues and the method proceeds to step 202. If the signal receive level is not within valid performance parameters as determined in step 204 (i.e., signal receiver level is lower than expected), the method proceeds to step 208.

At step 208, receiver server 136 determines if an alternate signal is available. For example, an alternate signal may be obtained by one or more of signal receivers 118, 122, 126 and/or 130 from receiver server 136 (shown in FIG. 1) which is in communication with content server 102 (also shown in FIG. 1). In one embodiment, an alternate signal is available if the content that was to be provided to a signal receiver via satellite 108 can be obtained from content server by receiver server 136. In addition, in order for an alternate signal to be available, out-of-band communication from receiver server 136 to receiver controller 134 must have enough bandwidth to support transmission of the content. If an alternate signal is not available, the method proceeds to step 206 and use of the broadcast signal continues. If an alternate signal is available, the method proceeds to step 210 where a timer is started. In one embodiment, the timer has a value which expires after a predetermined time period. For example, the time period can represent an amount of time after which RF signals received by dish 114 normally return to a signal receive level within valid parameters (e.g., an expected signal receive level).

At step 212, the alternate signal path is used to obtain the alternate signal. In one embodiment, use of the alternate signal path is initiated by receiver server 136 transmitting instructions to receiver controller 134 to utilize the alternate signal path (i.e., the communication path between receiver server 136 and receiver controller 134) and also provides a timer value. At step 214, receiver server 136 determines if the timer has expired. If the timer has not expired, the method proceeds to step 212 and use of the alternate signal path continues. If the timer has expired, the method proceeds to step 216. At step 216, receiver server 136 determines if the signal receive level is within valid performance parameters (e.g., an expected signal receive level). If the signal receive level is within valid performance parameters, then the method proceeds to step 206 and the use of the RF signal begins again. If the signal receive level is not within valid performance parameters (e.g., signal receive level is lower than expected), the method proceeds to step 208.

In one embodiment, method 200 continues to be performed by receiver server 136 as long as one or more of receivers 118, 122, 126, and 130 are operating (i.e., outputting signals for display to a user). It should be noted that method 200 is described above as being performed by receiver server 136. In one embodiment, method 200 is performed by receiver controller 134 based on data received from receiver server 136. In one embodiment, signal receivers communicate with receiver server 136 directly.

As shown in FIG. 1, signal receivers 118, 122, 126, and 130 each receive signals from dish 114 via RF signal switch 116. As such, certain problems can be diagnosed based on variation between signal receive levels of the receivers. For example, if one of signal receivers 118, 122, 126, or 130 is experiencing lower than expected signal receive levels, the problem is most likely with transmission of a signal from dish 114 to the receiver with the lower than expected signal receive level and not with dish 114. If all signal receivers connected to a common dish are experiencing lower than expected signal receive levels, the problem is most likely caused by an obstruction causing signal disruption, a problem with the dish, and/or a problem with the RF signal switch.

Figure 3:
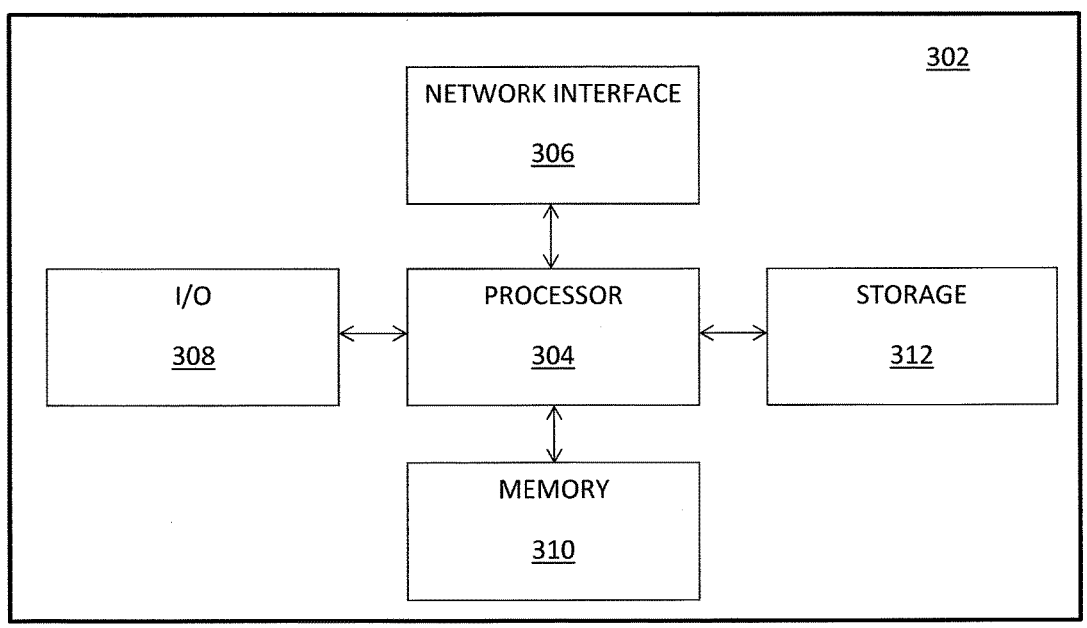
FIG. 3 depicts a high-level block diagram of a computer.

Satellite 108, RF signal switch 116, signal receivers 118, 122, 126, 130, displays 120, 124, 128, 132, receiver controller 134, receiver server 136, receiver database 138, and content server 102 can each be implemented using a computer. A high-level block diagram of such a computer is illustrated in FIG. 3. Computer 302 contains a processor 304 which controls the overall operation of the computer 302 by executing computer program instructions which define such operation. The computer program instructions may be stored in a storage device 312, or other computer readable medium (e.g., magnetic disk, CD ROM, etc.), and loaded into memory 310 when execution of the computer program instructions is desired. Thus, the method steps of FIG. 2 can be defined by the computer program instructions stored in the memory 310 and/or storage 312 and controlled by the processor 304 executing the computer program instructions. For example, the computer program instructions can be implemented as computer executable code programmed by one skilled in the art to perform an algorithm defined by the method steps of FIG. 2. Accordingly, by executing the computer program instructions, the processor 304 executes an algorithm defined by the method steps of FIG. 2. The computer 302 also includes one or more network interfaces 306 for communicating with other devices via a network. The computer 302 also includes input/output devices 308 that enable user interaction with the computer 302 (e.g., display, keyboard, mouse, speakers, buttons, etc.) One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method comprising:
   receiving signal receive level data from a plurality of signal receivers, the signal receive level data associated with an original signal comprising content from a specific content server, the original signal transmitted to the plurality of signal receivers via a satellite;
   receiving an alternate signal from the specific content server, the alternate signal comprising the same data from the specific content server as the original signal;
   determining if a signal receive level is below a minimum signal receive level required to display content with a limited amount of pixilation and audio distortion;
   determining whether an alternate signal path has available bandwidth to support transmission of the alternate signal in response to determining that the signal receive level is lower than expected;
   transmitting an instruction to one of the plurality of signal receivers, the instruction comprising an indication that the alternate signal is to be received via the alternate signal path in response to determining that the alternate signal path has available bandwidth to support transmission of the alternate signal, the instruction further comprising a timer value specifying a period of time that the alternate signal is to be received via the alternate signal path; and
   receiving signal receive level data from the one of the plurality of signal receivers, the signal receive level data from the one of the plurality of signal receivers determined by the one of the plurality of signal receivers in response to expiration of the period of time.

2. The method of claim 1, further comprising:
   transmitting the alternate signal via the alternate signal path.

3. The method of claim 1, wherein the timer value is based on an amount of time over which a prior signal disruption occurred.

4. The method of claim 1, further comprising:
   receiving an indication that the signal receive level is at an expected value; and
   transmitting an instruction comprising an indication that the original signal is to be received via an original signal path.

5. The method of claim 4, wherein the original signal is a radio frequency signal transmitted from a satellite.

6. The method of claim 1, wherein the alternate signal is transmitted via out-of-band communications.

7. An apparatus comprising:
   a processor; and
   a memory to store computer program instructions, the computer program instructions when executed by the processor cause the processor to perform operations comprising:
      receiving signal receive level data from a plurality of signal receivers, the signal receive level data associated with an original signal comprising content from a specific content server, the original signal transmitted to the plurality of signal receivers via a satellite;
      receiving an alternate signal from the specific content server, the alternate signal comprising the same data from the specific content server as the original signal;
      determining if a signal receive level is below a minimum signal receive level required to display content with a limited amount of pixilation and audio distortion;
      determining whether an alternate signal path has available bandwidth to support transmission of the alternate signal in response to determining that the signal receive level is lower than expected;
      transmitting an instruction to one of the plurality of signal receivers, the instruction comprising an indication that the alternate signal is to be received via the alternate signal path in response to determining that the alternate signal path has available bandwidth to support transmission of the alternate signal, the instruction further comprising a timer value specifying a period of time that the alternate signal is to be received via the alternate signal path; and
      receiving signal receive level data from the one of the plurality of signal receivers, the signal receive level data from the one of the plurality of signal receivers determined by the one of the plurality of signal receivers in response to expiration of the period of time.

8. The apparatus of claim 7, the operations further comprising:
   transmitting the alternate signal via the alternate signal path.

9. The apparatus of claim 7, wherein the timer value is based on an amount of time over which a prior signal disruption occurred.

10. The apparatus of claim 7, the operations further comprising:
   receiving an indication that the signal receive level is at an expected value; and
   transmitting an instruction comprising an indication that the original signal is to be received via an original signal path.

11. The apparatus of claim 10, wherein the original signal is a radio frequency signal transmitted from a satellite.

12. The apparatus of claim 7, wherein the alternate signal is transmitted via out-of-band communications.

13. A non-transitory computer readable medium storing computer program instructions which, when executed by a processor, cause the processor to perform operations comprising:
   receiving signal receive level data from a plurality of signal receivers, the signal receive level data associated with an original signal comprising content from a specific content server, the original signal transmitted to the plurality of signal receivers via a satellite;
   receiving an alternate signal from the specific content server, the alternate signal comprising the same data from the specific content server as the original signal;
   determining if a signal receive level is below a minimum signal receive level required to display content with a limited amount of pixilation and audio distortion;
   determining whether an alternate signal path has available bandwidth to support transmission of the alternate signal in response to determining that the signal receive level is lower than expected;
   transmitting an instruction to one of the plurality of signal receivers, the instruction comprising an indication that the alternate signal is to be received via the alternate signal path in response to determining that the alternate signal path has available bandwidth to support transmission of the alternate signal, the instruction further comprising a timer value specifying a period of time that the alternate signal is to be received via the alternate signal path; and
   receiving signal receive level data from the one of the plurality of signal receivers, the signal receive level data from the one of the plurality of signal receivers determined by the one of the plurality of signal receivers in response to expiration of the period of time.

14. The non-transitory computer readable medium of claim 13, the operations further comprising:
   transmitting the alternate signal via the alternate signal path.

15. The non-transitory computer readable medium of claim 13, wherein the timer value is based on an amount of time over which a prior signal disruption occurred.

16. The non-transitory computer readable medium of claim 13, the operations further comprising:
   receiving an indication that the signal receive level is at an expected value; and
   transmitting an instruction comprising an indication that the original signal is to be received via an original signal path.

17. The non-transitory computer readable medium of claim 16, wherein the original signal is a radio frequency signal transmitted from a satellite.

* * * * *